P. H. HENDRICKSON.
SHOCK ABSORBER.
APPLICATION FILED JAN. 16, 1922.
1,437,417.
Patented Dec. 5, 1922.
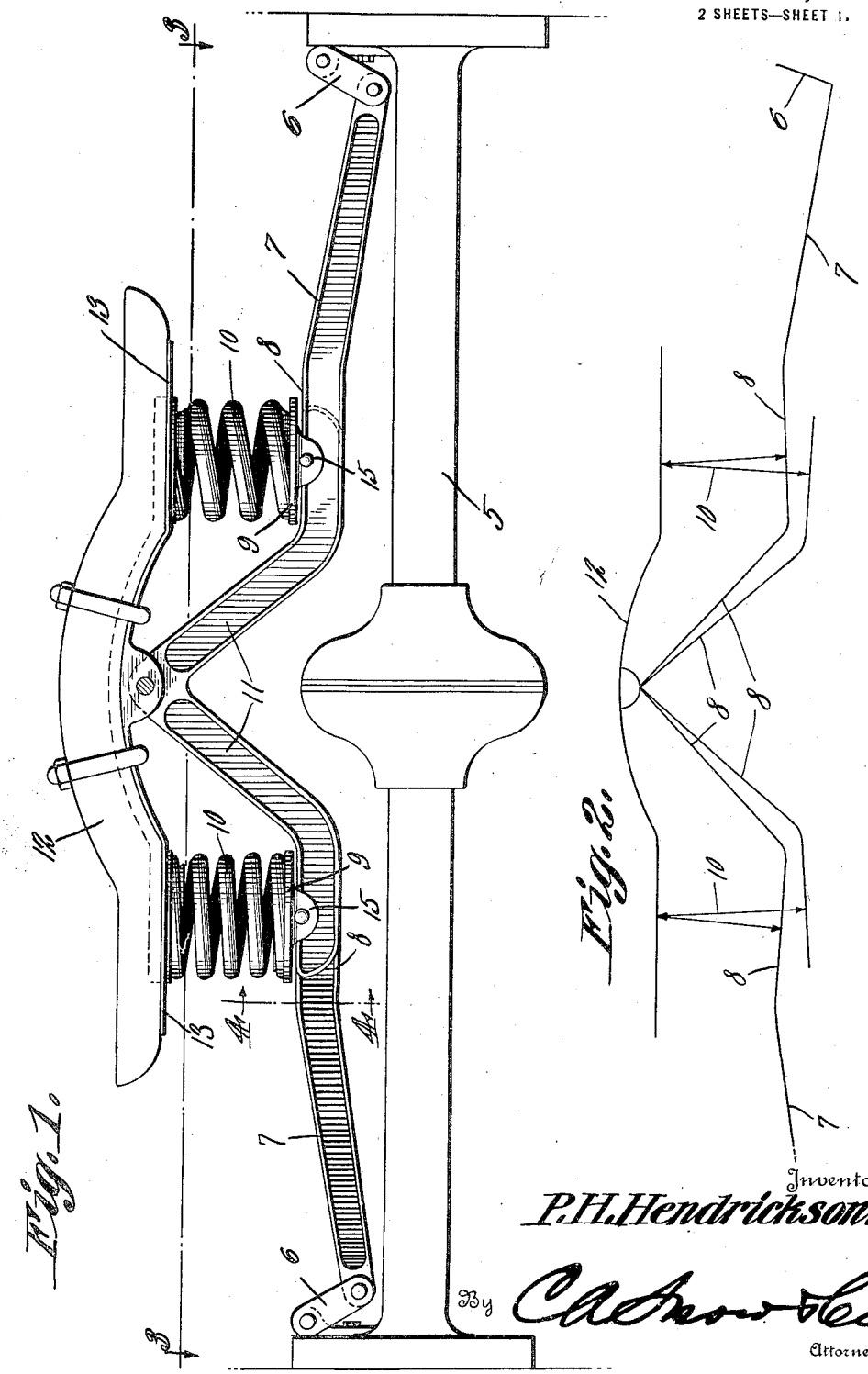

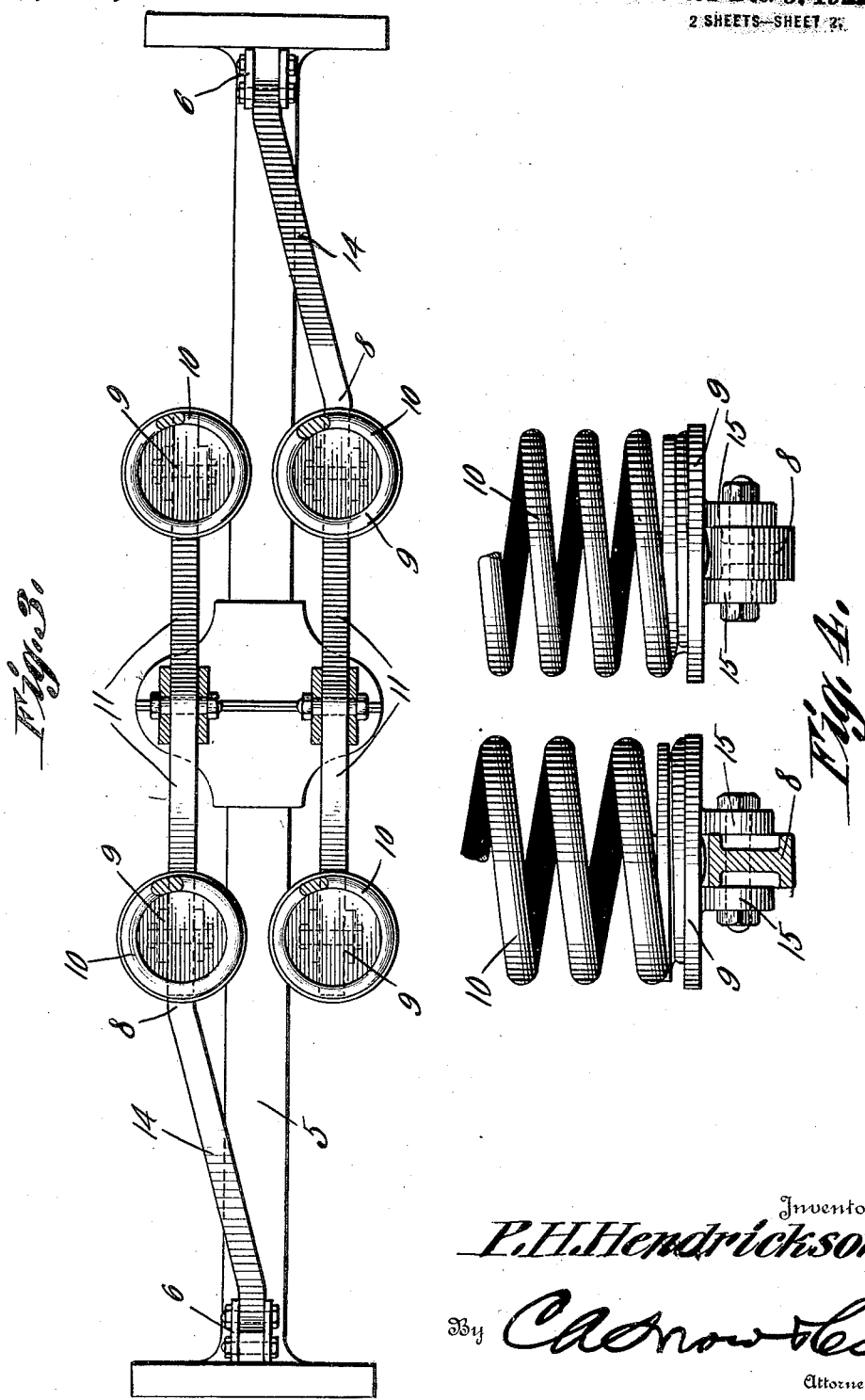

Patented Dec. 5, 1922.

1,437,417

UNITED STATES PATENT OFFICE.

PETER H. HENDRICKSON, OF COEUR D'ALENE, IDAHO.

SHOCK ABSORBER.

Application filed January 16, 1922. Serial No. 529,683.

*To all whom it may concern:*

Be it known that I, PETER H. HENDRICKSON, a citizen of the United States, residing at Coeur d'Alene, in the county of Kootenai and State of Idaho, have invented a new and useful Shock Absorber, of which the following is a specification.

This invention has reference to spring devices, and more particularly to spring devices used in connection with motor vehicles.

The primary object of the invention is to provide a device of this character which will equalize lateral strains directed to the body portion of the vehicle, caused by the wheels of the vehicle passing over irregularities in a road surface.

Another object of the invention is to provide a spring device which may be readily and easily applied to motor vehicle structures, eliminating the necessity of making extensive alterations in the structure to accomplish the application of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a rear elevational view of a motor vehicle chassis and disclosing a spring device constructed in accordance with the present invention as applied.

Figure 2 is a diagrammatical view disclosing the positions of the spring supporting arms, when the vehicle has encountered irregularities in a road surface.

Figure 3 is a sectional view taken on line 3—3 of Figure 1.

Figure 4 is a sectional view taken on line 4—4 of Figure 1.

Referring to the drawing in detail, the reference character 5 designates the rear axle housing of a motor vehicle, the spring device forming the subject matter of this invention, being supported thereabove.

The reference character 6 designates the usual shackles employed in spring constructions, and as shown, an arm indicated at 7 has pivotal connection with each shackle. Each of these arms 7 is formed with a substantially horizontal portion to accommodate the pivoted spring supporting plates 9 that are shown as supporting the coiled spring members 10, the spring members 10 having their lower ends contacting with the plates 9.

An upwardly extending portion 11 forms a part of each arm, and provides means for pivotally connecting the arms to the transversely extending brace bars 12 forming a part of the usual motor vehicle structure. Thus it will be seen that the brace bars 12 and the body of a vehicle supported thereby, will be free to rock with respect to the arms 7.

Spring supporting plates 13 are secured to the under surfaces of the brace bars 12 and accommodate the upper ends of the coiled springs 10 to secure the spring thereto, so that any movement of the bars 12 will be directed to the coiled springs 10. These arms 7 are also formed with angularly disposed portions 14 so that the arms may be used in pairs to operate independently of each other.

The plates 9 are also formed with depending ears 15 spaced apart to accommodate the arms 7 to which the same are applied.

From the foregoing it will be seen that if one of the springs 10 is compressed, that is to say one of the springs supported by a particular arm 7, the opposite spring member is expanded, the expansion and contraction of the springs equalizing the strains directed to the body portion of the vehicle supplied with the spring device to absorb the sudden jar or shock caused by the vehicle passing over irregularities in the road surface.

Having thus described the invention, what is claimed as new is:—

A spring device comprising in combination with the brace bars of a vehicle chassis, and the rear axle housing thereof, arms pivotally supported adjacent to the ends of the axle housing, the arms extending at angles with respect to the axle housing and having parallel end portions, the parallel end portions having upwardly extended portions, said upwardly extended portions being disposed in spaced relation with each other, and having pivotal connection with the brace bar of a vehicle chassis, a pair of coiled springs supported by each arm, the coiled springs being disposed on opposite sides of the upwardly extended portions, and said coiled springs having connection with the brace bar.

In testimony that I claim the foregoing as my own, I have hereto affixed my signature in the presence of two witnesses.

PETER H. HENDRICKSON.

Witnesses:
Jos. M. Rhodes,
H. H. Hubbard.